United States Patent [19]

O'Hanlon

[11] 4,088,119
[45] May 9, 1978

[54] MEANS AND METHODS OF PREVENTING THE LOSS OF SOLAR HEAT

[76] Inventor: Edward J. O'Hanlon, Assembly Point, Lake George, N.Y. 12845

[21] Appl. No.: 637,638

[22] Filed: Dec. 4, 1975

[51] Int. Cl.² .............................................. F24J 3/02
[52] U.S. Cl. ................................... 126/271; 237/1 A
[58] Field of Search ............... 126/270, 271; 237/1 A; 236/99 D; 337/306, 289; 219/517; 137/79, 80, 78

[56] References Cited

U.S. PATENT DOCUMENTS

| | | | |
|---|---|---|---|
| 1,888,620 | 11/1932 | Clark | 126/271 |
| 2,392,613 | 1/1946 | Persons | 337/306 |
| 2,678,233 | 5/1954 | McCabe | 337/306 |
| 3,620,206 | 11/1971 | Harris et al. | 126/271 |

Primary Examiner—Kenneth W. Sprague
Assistant Examiner—James C. Yeung

[57] ABSTRACT

In order to prevent the cooling of the working fluid in a solar heat collecting system, the present apparatus and process responds rapidly to shut off the circulation of the working fluid (either liquid or gaseous) through the solar heat collecting equipment, when the rays of the sun are clouded over or when at nightime, they are non-existent. Solar heat that has been properly accumulated and stored is effectually prevented from radiating back out of the solar heat collecting system into the outer atmosphere.

4 Claims, 8 Drawing Figures

MEANS AND METHODS OF PREVENTING THE LOSS OF SOLAR HEAT

There are several ways of collecting solar heat, and various ways of storing it, but since the apparatus for collecting it can dissipate it back to the atmosphere, if means and method is not provided for preventing this dissipation to occur, any system heat collecting warmth from the sun may be accompanied by solar heat dissipation in the reverse direction. This reduces its solar heat collecting effectiveness and efficiency enormously. The prime purpose here is to prevent this from taking place.

In the drawings

Figure 7:
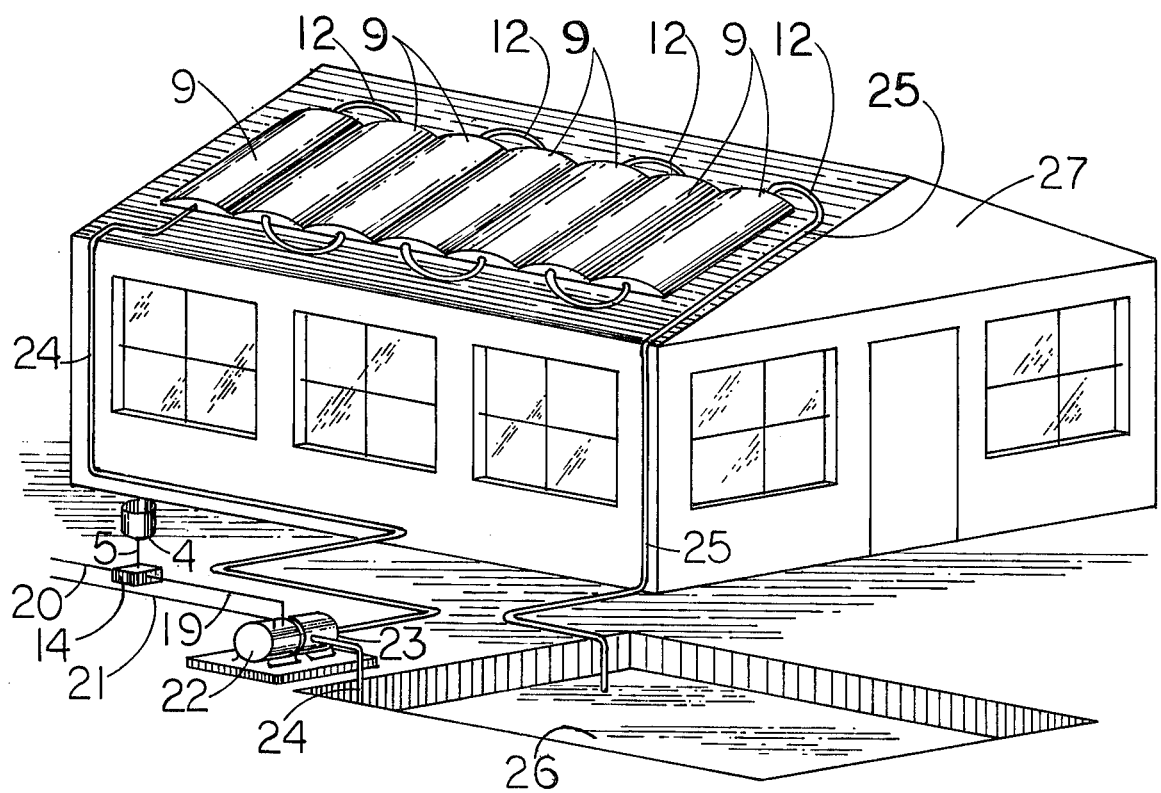

FIG. 7 displays a working model of my system for stopping the flow of working fluid in a solar heat collecting system and for causing the working fluid to again flow, in the event the flow of solar heat from the sky is interrupted by clouds moving across the sky, which after they have passed, again reveal the sun, and the resumption, after the clouds, of the return arrival of its continued solar warmth, to my solar heat collecting system.

Figure 3:
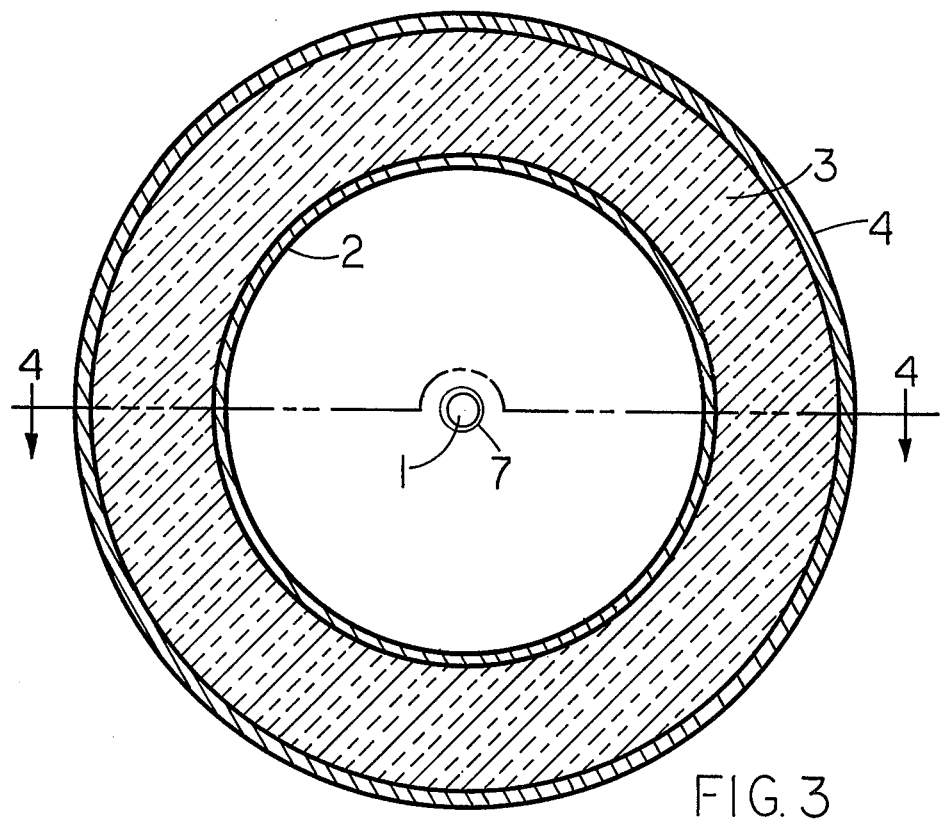
FIG. 3 is a plan view of my working fluid flow controller.
Figure 4:
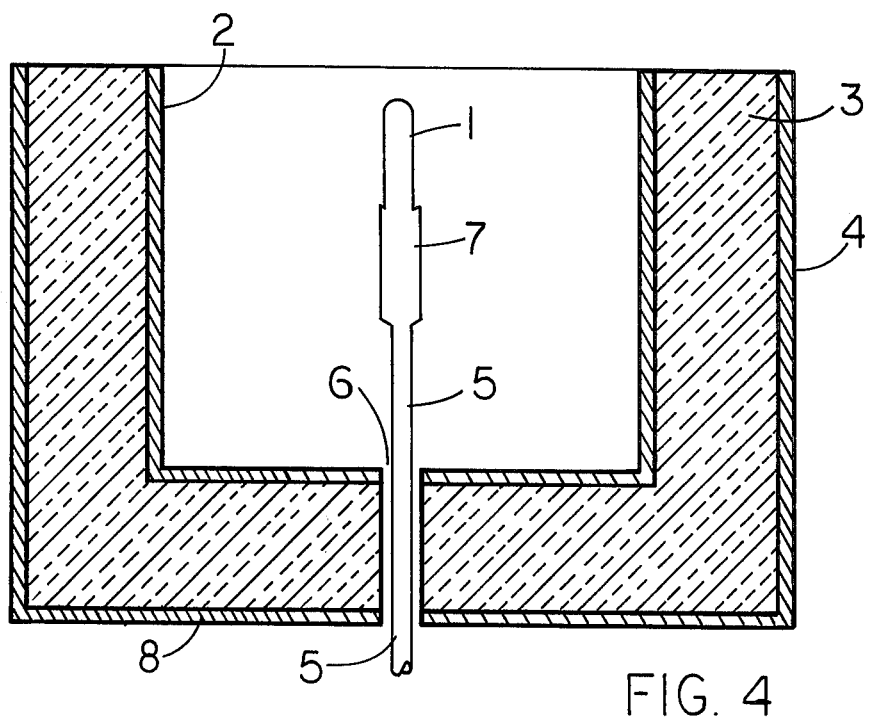
FIG. 4 is a cross sectional view of my working fluid flow controller shown along the lines 4 — 4 in FIG. 3.
Figure 8:
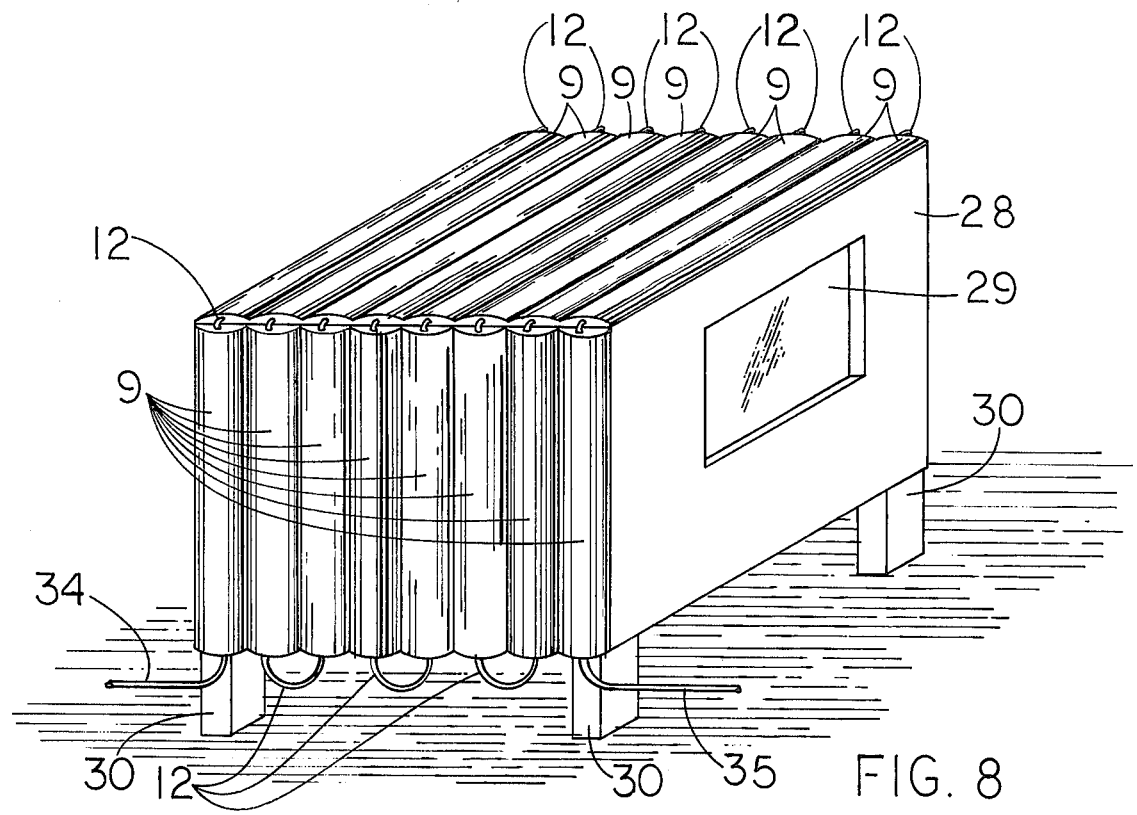

FIG. 8 is an external view of a cabana, suitable for use near a swimming pool, the cabana being comprised of the solar heat collecting elements such as are shown in FIGS. 3 and 4.

In designing my solar heat collecting elements shown here as numeral 9, I have adopted an aerofoil section, as indicated at number 11 to obtain as much solar heating surface as is possible compared to the surface on which these same elements are reposing. Their upper surface directly exposed to the heat of the sun is blackened by black paint or any other known means of darkening its upper surface.

As to the other numerals appearing in the drawings, these are . . . . (1) heat sensitive thermal bulb filled with the same type of liquid as is ordinarily inside the bulb and tube of a thermometer. Numberal 2 is the inner cannister with a shiny surface focusing the rays of the sun on the bulb 1 and its extensions shown here as numberals 7 and 5. Number 4 is the outer cannister of my solar sensitive working fluid controller, particularly that portion 5 of it controlling the flow of electric current to stop and start the electric motor 22, driving working fluid pump 23 (see FIG. 7).

Numeral 3 is the plastic foam insulation in the space between the canisters 2 and 4. Orafice 6 is provided at the bottom for releasing tube 5 from the interior of shiny and highly reflective canister 2.

In certain installations I find it advisable to place a sheet of clear glass or plastic over the canisters 2 and 4. But this is not at present shown in these drawings.

Numeral 7 is an expansion chamber in tubes 1 and 5. Number 8 is the bottom of canister 4. Solar collector 9 appears at several places in these various Figures. The entrance and exit tubes where the working fluid enters and leaves solar heat collector 9 is here designated by numeral 10. The end inserts welded, soldered or otherwise closing the two ends of unit 9 are here disclosed by the numeral 11. Number 12 is the hose connection in FIG. 5 for connecting several of the units 9 together to make a solar heating bed of solar heat collectors. Each end of these hose connectors have metallic hose coupling 31 with ears 32, the end of the hose being secured by hose clamps 13.

Figure 1:
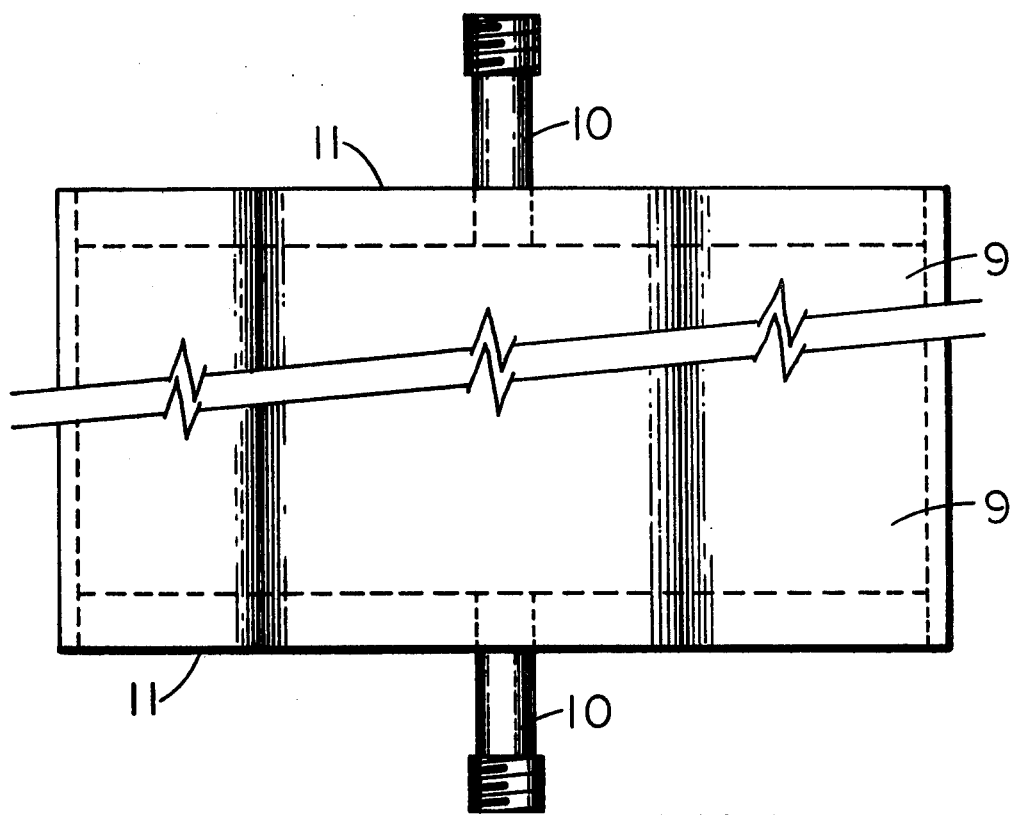
FIG. 1 is a plan view of my solar heat collecting element.
Figure 2:
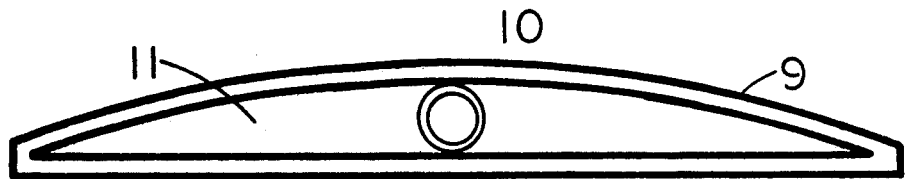
FIG. 2 is an end view of the element shown in FIG. 1.
Figure 5:
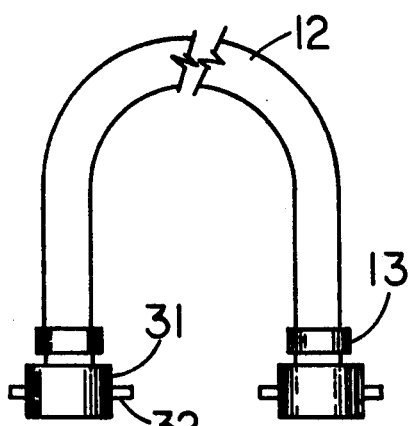
FIG. 5 shows my type of rubber hose connector used to connect the elements shown in FIG. 1.
Figure 6:
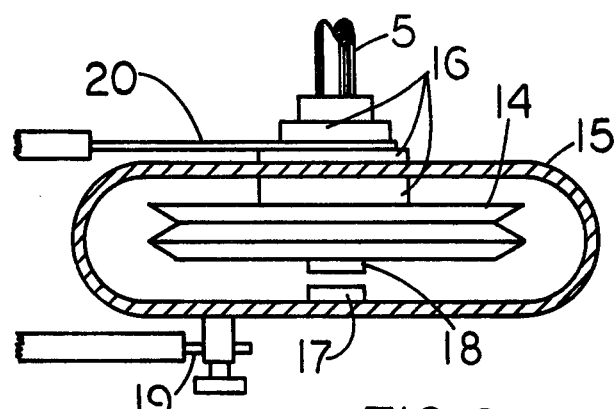
FIG. 6 is a side view in elevation of my electrical connecting and disconnecting device shown as an extension of the equipment illustrated in FIG. 3 and FIG. 4.

As the thermostatic liquid in tubes 1, 7 and 5 expands and contracts, this expansion and contraction is reflected by the out and inward movement of diaphram 14 shown in FIG. 6, the expansion and contraction of diaphram 14 closing and opening the electrical connection exhibited by numeral 14. This electrical contact unit shown in FIG. 5 is provided with circular electrical insulation ringlike elements 16, insulating any electricity from passing into or through oval metallic element 15 holding the diaphram 14 and its electrical contacts 17 and 18. FIG. 5 shows how the tube 5 enters the diaphram 14, the thermometric fluid inside of the tube 5 pushing the contacts 17 and 18 together or pulling them apart, according to whether the sunshine is expanding the liquid inside of tubes 1, 7 and 5 or failing to do so, as clouds pass over the unit.

In FIG. 6 electric wire 19 is that between electric contact 17 and electric motor 22 driving fluid (liquid) pump 23. Electric wire 18 20 brings in electricity from some outer source into and in connection with electrical contact 14 and motor 22 driving pump 23.

Fluid pump 23 brings up the working fluid from swimming pool 26 through pipe 24 and sends it up through solar heat collectors 9 resting on the roof of shelter structure 27 which faces the south. This working fluid, after it has picked up solar heat, returns to swimming pool (or solar heat storage unit) 26.

In FIG. 8, I show a cabana 28 composed largely of solar heat collecting units 9 connected by numerous rubber tube connectors 12. The back wall of the cabana is numeral 29, the cabana's feet here being shown as numerals 30. At 34 is shown a tube (rubber tube) leading to fluid pump 23 and at 35 another rubber hose leading to swimming pool 26. Here in the drawings, it can be assumed that all the heating units 9, 9, 9, etc. are suitably connected by hose connectors as shown in FIG. 5 in order to make a single elongated path for the solar heat collecting, working fluid, to enter at one point and leave at one point, namely at 34 and 35.

It will thus be seen that as the sun shines, it is directly reflected by the inner shiny circular surfaces of canister 2 onto the heat sensitive elements 1, 7 and 5 closing the electrical connection 17 and 18 by the expansion of diaphram 14. If the sun is not shining, the reflection of sun heat and light is non-existent, the diaphram 14 contracts and the electrical contacts 17 and 18 brake apart, the motor 22 driving the pump 23 stops and the solar warmed liquid no longer comes out of pool 26 to lose its stored solar heat out through the solar heat collectors 9. When the sun shines again, the reverse action takes place all along the electrical line, and the solar heat pick-up system again begins to pick up more solar heat. This enables the collection of solar warmth when the sun is out, and prevents the loss of solar heat from the heat storage 26 when the sun is not present to contribute heat to the solar heat collection system. Be it understood that the use of gaseous working fluid is here clearly anticipated although it is not shown in the drawings.

I claim:

1. In a solar heat collecting system having a solar heat collecting working fluid moving in a piping circuit between a solar heat collector and a solar heat storage unit thermometric means positioned within said piping circuit for interrupting the flow of said solar heat collecting working fluid in accordance with the temporary absence of the direct rays of the sun contributing the solar heat to said solar heat collecting system, said means comprising, an externally insulated can with an inner highly reflective surface, a thermometrically sensitive element centrally positioned in said can said element connected to an expanding and contracting diaphram which opens and closes an electric circuit.

2. The invention claimed in claim 1 wherein said solar heat collecting fluid is a liquid.

3. The invention claimed in claim 1 including an electrically driven pump producing the movement of said moving solar heat collecting fluid.

4. The invention claimed in claim 1 wherein said solar heat collecting fluid is a gas.

* * * * *